(12) United States Patent
Kelley

(10) Patent No.: US 6,998,457 B2
(45) Date of Patent: Feb. 14, 2006

(54) HIGH TEMPERATURE PROCESS FOR THE PRODUCTION OF ATACTIC, AMORPHOUS, TACKY PROPYLENE POLYMERS

(76) Inventor: Joseph M. Kelley, 1321 E. Broad St., Westfield, NJ (US) 07090

( * ) Notice: Subject to any disclaimer, the term of this patent is extended or adjusted under 35 U.S.C. 154(b) by 0 days.

(21) Appl. No.: 10/430,082

(22) Filed: May 6, 2003

(65) Prior Publication Data

US 2003/0191252 A1   Oct. 9, 2003

Related U.S. Application Data

(63) Continuation of application No. 08/409,893, filed on Mar. 23, 1995, now Pat. No. 6,586,536, which is a continuation of application No. 08/079,982, filed on Jun. 18, 1993, now abandoned.

(51) Int. Cl.
*C08F 210/00* (2006.01)
(52) U.S. Cl. ............... 526/348; 526/124.3; 526/124.2; 526/124.1; 526/160; 526/943
(58) Field of Classification Search ............... 526/64, 526/348, 124.2, 125.5, 125.8, 124.1, 124.3, 526/160, 943
See application file for complete search history.

(56) References Cited

U.S. PATENT DOCUMENTS

| | | | |
|---|---|---|---|
| 4,129,701 A * | 12/1978 | Jezl et al. | 526/65 |
| 4,322,514 A * | 3/1982 | Miyoshi et al. | 526/124.4 |
| 4,736,002 A * | 4/1988 | Allen et al. | 526/124.7 |
| 6,586,536 B1 * | 7/2003 | Kelley | 526/64 |

FOREIGN PATENT DOCUMENTS

EP          0 360 094      *   3/1990

* cited by examiner

*Primary Examiner*—Ling-Sui Choi

(57) ABSTRACT

Atactic or amorphous poly-alpha-olefins containing 100%–65% propylene and optionally up to about 35% ethylene and/or up to about 15% of a $C_4$–$C_8$ alpha-olefin are prepared by polymerizing the monomer(s) at 180–450° F. and at a pressure sufficient to substantially maintain the monomer(s) in the liquid phase. The polymerization is carried out in the presence of catalyst system consisting of (a) a transition metal halide selected from the group consisting of (i) a titanium trihalide and an aluminum alkyl, (ii) a titanium halide on a comminuted magnesium halide support, and (iii) a titanium halide sandwich compound and (b) aluminum alkyl as a co-catalyst. No stereoregulator or only minor amounts of a stereoregulator are used.

Figure 1:
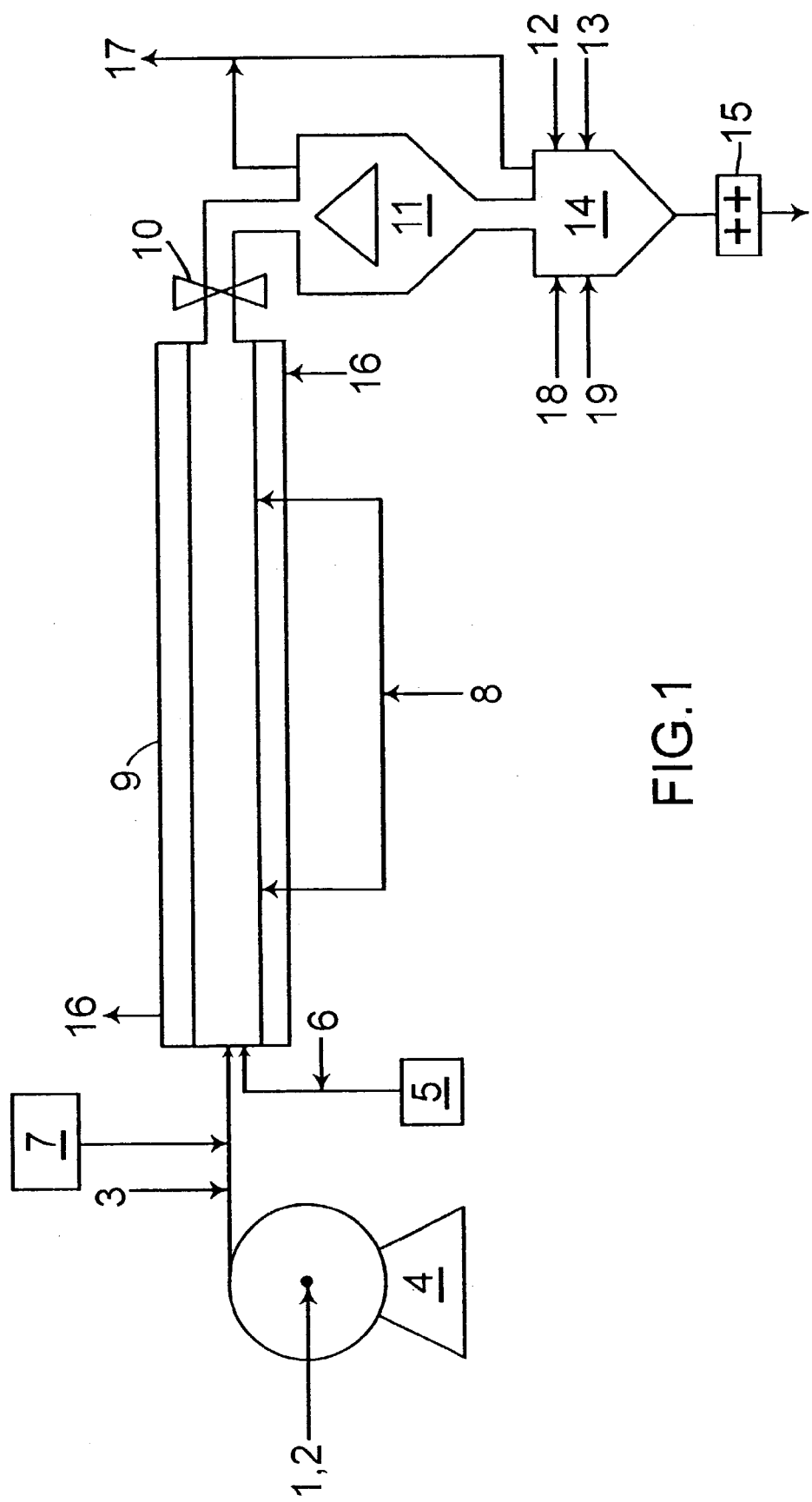

21 Claims, 1 Drawing Sheet

HIGH TEMPERATURE PROCESS FOR THE PRODUCTION OF ATACTIC, AMORPHOUS, TACKY PROPYLENE POLYMERS This application is a continuation of Ser. No. 08/409,893, filed Mar. 23, 1995, now U.S. Pat. No. 6,586,536, which is a continuation of Ser. No. 08/079,982, filed Jun. 18, 1993, now abandoned.

BACKGROUND OF THE INVENTION

The present invention relates to the production of atactic or amorphous poly-alpha-olefins. More particularly it relates to a high temperature process for the production of non-crystalline or low crystallinity polymers and copolymers.

In the early processes for the production of isotactic or crystalline polypropylene, the initial catalyst systems (brown or violet titanium trichloride) were not very stereospecific and appreciable amounts of amorphous or atactic polypropylene were coproduced along with the desired isotactic polymer. These atactic or amorphous polymers were low melting non-crystalline or low crystallinity polymers with poor physical properties compared to isotactic polypropylene. The atactic or amorphous polymer had to be removed by solvent extraction so that the properties of the isotactic polymer were not degraded. At first, this material was burned or discarded by burial. Gradually, means were found to purify this material by removing the catalyst residues and solvent, and the resulting tacky, low molecular weight solid material found applications as an ingredient in hot melt adhesives, sealants, and bituminous formulations. However, the product quality was variable, with no two batches of material being exactly the same. The situation was further complicated by the fact that some material resulted from copolymer production and other material resulted from homopolymer production. The market for the amorphous material developed nicely. However, as the catalysts were improved, the amorphous polymer content was reduced to such a low value that it was not necessary to remove the atactic or amorphous polymer from the isotactic polypropylene. Producers found the demand for atactic or amorphous polymers outstripping the supply. Material which had been discarded earlier was mined from atactic pits and purified by acid washing and steam distillation. One polypropylene producer's catalyst system for isotactic polymer was very poor and large quantities of atactic were produced, giving that producer a reasonable supply of amorphous poly-alpha-olefins (APAO). Another producer converted an isotactic polypropylene line to amorphous production and used a magnesium chloride ($MgCl_2$) supported titanium catalyst minus the stereoregulator to produce "on purpose" APAO. This approach increased the quality and consistency of the amorphous product and allowed production of copolymers and terpolymers which had properties which were appreciably different from the coproduct atactic produced with isotactic polypropylene. This approach also opened up a potential for different materials which might have new applications.

U.S. Pat. No. 4,736,002 (issued Apr. 5, 1988 to G. Allen et al.) describes a process for preparing amorphous polypropylene and copolymers at relatively low temperatures of 150° F. in liquid propylene, utilizing a converted isotactic polypropylene polymerization line. The disadvantages of this process are the necessity to operate the polymerization at low temperatures due to the inherent tackiness of the amorphous polymers and copolymers and the resulting low polymerization rates.

As a result of the building of new plants using the improved catalysts and the closing of old plants, there has occurred a shortage of atactic polypropylene.

It is an object of the present invention to provide a process to produce predominately atactic polypropylene for use in the roofing, adhesive and other markets. It is also an object of this invention is to provide a high temperature polymerization or copolymerization process in a tubular reactor to maximize the polymerization rate and reduce the stereoregularity of the polymer.

Another object of the present invention is to produce amorphous alpha-olefin polymers and copolymers which can be used in many applications. It is also an object of the present invention to prepare new polymers and copolymers which can not be produced by existing processes for preparing amorphous polyolefins.

SUMMARY OF THE INVENTION

The present invention provides a high temperature process for the production of amorphous polymers in the absence of solvent or a large excess of monomer used as diluent. As used herein, the term "polymer" is intended to cover homopolymers, copolymers, terpolymers and the like, as well as graft polymers with polar monomer(s). The high temperatures employed in the process allow polymerization at very high rates and favor the formation of atactic polymer over isotactic polymer. Lack of stereoregularity is desirable for the end uses intended for these amorphous polymers. The polymerization is carried out in a tubular reactor at temperatures of 180–450° F. in the presence of a catalyst system comprising a titanium chloride catalyst supported on magnesium chloride and activated with an aluminum alkyl without a stereoregulator. The catalyst system is selected to give amorphous polymers at efficiencies so high that the catalyst residues are insignificant and do not need to be removed. Excess monomer(s) are removed by devolatilization in two stages and catalyst residues are deactivated by the addition of steam. Antioxidants are added in the devolatilization section to prevent polymer breakdown during subsequent processing into hot melt adhesive formulations. In the tubular reactor, monomer may added at several injection points along the length of the reactor for purposes of cooling. The polymerization can be carried out in a stirred, pressure autoclave reactor as well. Pressures of 600 psig to 5000 psig can be used in the process depending on the monomer composition (higher pressures for higher % ethylene feeds) and the operability of the system at higher melt viscosities. Higher pressure will be used with higher viscosity materials, i.e., higher molecular weight materials for ease of operation of the reactor.

The amorphous polymer can be reactively coupled (i.e., grafted) with many polar monomers by adding peroxide and the polar monomer(s) after the devolatilization section in a melt pump or extruder.

DESCRIPTION OF PREFERRED EMBODIMENTS

The process comprises the steps of (a) feeding 100% to 65% by weight of propylene monomer, 0% to 35% by weight of ethylene monomer and optionally up to 15%, preferably 5–15%, by weight of a $C_4$–$C_8$ alpha-olefin to a jacketed tubular reactor which is about 2–6 inches in diameter and about 100–1000 feet in length and polymerizing the monomer(s) at a temperature between about 180 and 450° F. and at a reactor pressure between about 450 to 5000 psig in the presence of (a) about 0.1 to about 2.5 mol % hydrogen based on monomer feed and (b) a catalyst composition comprising (i) a solid catalyst produced by co-comminuting a magnesium halide support and an aluminum trihalide in a molar ratio of from about 8:0.5 to about 8:3 in the absence of an added electron donor and then co-comminuting the resultant product, in the absence of an electron donor, with sufficient titanium tetrahalide to provide a molar ratio of magnesium halide to titanium tetrahalide of from about 8:0.4 to about 8:1 and (ii) a co-catalyst which is a mixture of from about 15 to about 90 mol % of a trialkyl aluminum having from 1 to 9 carbon atoms in each alkyl group and about 85 to about 10 mol % of an alkyl aluminum halide having at least one halide group per molecule, the co-catalyst mixture being present in an amount sufficient to provide an aluminum to titanium (Al/Ti) molar ratio of about 50:1 to about 600:1; and (c) recovering substantially amorphous polymer. In the above process, if a minor amount of stereoregulator is added, a polymer of somewhat enhanced stereoregularity, and thus higher tensile strength, is obtained.

The polymerization can also be carried out in the presence of alternate catalyst systems consisting essentially of (i) a trialkyl aluminum compound and an aluminum reduced titanium trichloride ($3TiCl.AlCl_3$) in amounts sufficient to provide an aluminum to titanium (Al/Ti) molar ratio from about 1:1 to about 10:1; (ii) an aluminum alkyl plus the solid magnesium halide supported aluminum trihalide-titanium tetrahalide catalyst described above and in U. S. Pat. Nos. 4,347,158 and 4,555,496, the disclosure of which is incorporated herein by reference, plus a minor amount (about 15–30% of the amount normally added for isotactic polypropylene, e.g., 0.1 to 0.2 moles of ethyl p-toluate per mole of aluminum alkyl) of an electron donor which regulates the stereospecificity of polypropylene (i.e. the catalyst of (b) above plus about 30% of ethyl para toluate or a phenyl silane derivative); (iii) a mixture of 0.1 molar alkyl aluminum halide and 0.1 molar titanium tetrahalide (e.g., titanium tetrachloride) which are mixed together in amounts sufficient to provide a 0.5:1 to 5:1 aluminum to titanium (Al/Ti) molar ratio and allowed to prereact in an inert diluent (e.g., heptane) for about 5 to about 30 minutes before addition of the catalyst slurry to the reactor; (iv) a catalyst prepared by mixing a titanium trihalide (e.g. titanium trichloride) in a diluent (e.g., hexane, p-xylene, or heptane) with a fluoride selected from the group consisting of pentaethyl dialuminum fluoride $(C_2H_5)_5Al_2F$, diisobutyl aluminum fluoride $(i-C_4H_8)_2AlF$, or diethyl aluminum fluoride $(C_2H_5)_2AlF$ or (v) a metallocene catalyst such as the catalyst prepared by mixing cyclopentadiene dissolved in a solvent (e.g., heptane) with a solution of transition metal halide (e.g., a heptane solution) to form, as a soluble sandwich compound, dicyclopentadienyl titanium. When catalyst system (iv) is used in the above described process, it produces about 97% atactic polypropylene with only about 3% isotactic or crystalline material. When the metallocene catalyst system (v) is used in combination with aluminum alkyls in the process described herein, it will produce substantially amorphous polymers and copolymers suitable for use in hot melt formulations.

All of these catalysts require an organometallic activator or co-catalyst such as an aluminum alkyl (e.g., aluminum trialkyl or dialkyl aluminum halide). The preferred co-catalyst for use with the above titanium catalysts is triethyl aluminum or a mixture of triethyl aluminum and diethyl aluminum chloride because they give the fastest rate of polymerization and because stereoregulation is not important, in fact it is undesirable. However, any other co-catalysts which have been used in transition metal catalysis can be employed herein.

To illustrate the tubular reaction system, reference is made to FIG. I. The various gaseous monomers or combinations thereof are introduced through lines 1 (e.g., propylene) and 2 (e.g., ethylene) to the compressor 4, which discharges into the tubular reactor 9. In addition, liquid monomers ($C_4$–$C_8$ alpha-olefins) 3, hydrogen 7, solid magnesium chloride ($MgCl_2$) supported titanium catalyst 5, and aluminum alkyl co-catalyst 6 are also added to the front end of the tubular reactor. Cold propylene is added at several points along the reactor 8 to cool the reaction mixture and water (or other heat transfer fluid) 16 is added to the outer jacket of the tubular reactor to cool the molten polymer reaction mixture. After a suitable residence time, the letdown valve 10 is opened periodically to discharge the polymer—monomer mixture into a separator vessel 11 equipped with a heated Chinese hat (an inverted, cone shaped, heated surface) and then into a second lower pressure vessel 14. To this vessel are added steam 12 and an antioxidant 13. The monomer off-gas stream from the two separator vessels is separated, dried and recycled. The molten polymer is discharged through a gear pump or short barrel extruder 15 and shipped in heated tank trucks or tank cars or packed out into strippable containers or briquetted. If graft polymers containing polar monomers are desired, then the peroxide 18 and polar monomer 19 (e.g., maleic anhydride or acrylic acid) is added.

The heat of polymerization is removed (a) by adding liquid propylene monomer at the reactor entrance and at several additional points along the tube, which by the heat of vaporization and rise in temperature (sensible heat) absorbs a considerable portion of the heat of polymerization and/or (b) by cooling the reactor by circulating water or another cooling fluid through the outer annular space of the jacketed reactor.

Under the above conditions, the polymerization is almost instantaneous with the residence time being about 0.1 to 10 minutes. The high temperatures, ethylene and/or other comonomer and catalyst selections all favor the production of a substantially amorphous or atactic polymer. The amorphous polymer may contain up to 5–20% of isotactic or crystalline polymer without significantly interfering with the desirable properties of the amorphous polymer. In fact, for paper lamination up to 7.5% of isotactic polypropylene is present to assure adhesion.

Adding a moderate amount of a stereoregulator (30–70%) such as ethyl para toluate or phenyl silane derivatives to the catalyst system results in polymers with increased tensile strength, which enhances the properties of any hot melt to which this partially amorphous polymer is added. The properties of these polymers produced with the stereoregulator are unique and outside of those expected in either an extraction or an "on purpose" process for preparing APAO polymers. Because of their unique properties, these polymers impart equally unique properties to the hot melt formulations.

As the polymer exits the tubular reactor, it is discharged through a let-down valve into a vessel maintained at low pressure and equipped with a Chinese hat. In this vessel, propylene and other olefins, if used, are removed and recycled back to the polymerization reactor. The molten polymer passes into a second heated vessel maintained at a lower pressure than the first vessel, to which small amounts of steam and antioxidants are added to inactivate the catalyst and stabilize the polymer. The resulting molten polymer is then slabbed, briquetted or shipped in molten form to the customer.

The variables in this process are interrelated to some extent and by changing the process variables and feed composition it is possible to produce polymers with a wide range of viscosities, ring and ball softening points, and needle penetrations. Their effects and interrelationships are discussed below.

The rate of polymerization is directly proportional to monomer concentration, with the highest rate being attainable with liquid monomer (100%). If the monomer is in the gaseous form under the conditions of the polymerization, then the polymerization rate tends to be directly proportional to the pressure in the reactor. The rate of polymerization also depends on the monomer used. The rate of ethylene polymerization is about 5 to 10 times that of propylene polymerization depending upon the type of catalyst system used, so that any ethylene added to the tubular reactor will tend to be almost completely polymerized by the time the polymer exits the reactor. Thus, recovery of ethylene is not a major problem. Propylene and butene-1 polymerization rates are appreciably slower than ethylene, with butene-1 being slightly slower than propylene. The polymerization rate of hexene-1 is also much slower than that of ethylene and somewhat slower than that of propylene. This means that when higher alpha-olefins are used, it will be necessary to remove unreacted monomer in the devolatilization section if the conversion is not 100%.

Hydrogen gas is added to the reactor in order to control the molecular weight of the resulting polymer. The higher the hydrogen concentration, the lower the molecular weight of the polymer. The hydrogen is introduced at the front end of the tubular reactor along with the monomer and catalyst.

The molecular weight of the polymer is inversely proportional to the polymerization temperature. Thus, as the reaction temperature is increased, the molecular weight of the polymer and its melt viscosity tend to decrease, all other conditions being unchanged. Thus, hydrogen addition and temperature regulation provide separate methods for controlling polymer molecular weight. For example, if at a given reactor temperature, the polymer molecular weight is too high, additional hydrogen can be added to lower the molecular weight.

There are several dependent variables which can be totally controlled by astute manipulation of the above independent variables. These dependent variables are polymer properties such as melt (Brookfield) viscosity, ring and ball softening point, and needle (or cone) penetration.

The viscosity is primarily a function of the molecular weight of the polymer. As the molecular weight of the polymer is decreased with hydrogen addition and/or by the use of a higher reaction temperature, the molecular weight and thus viscosity of the polymer decreases.

The ring and ball softening point is primarily a function of the polymer's structure. Anything which tends to interrupt the regularity of the polypropylene structure will lower the ring and ball softening point. Thus, copolymerization has the greatest effect on ring and ball softening point, tending to lower the softening point in direct proportion to the amount of comonomer in the copolymer.

The needle penetration is related to the ring and ball softening point and polymer's molecular weight or viscosity. Thus, the lower the ring and ball softening point, the higher the needle penetration tends to be, and the lower the viscosity, the higher the needle penetration (or cone penetration for soft materials).

The following examples will illustrate but do not limit the scope of the invention.

The properties of the resulting polymers are measured by the following tests. The melt viscosity is determined at 375° F./190° C. by ASTM test method D-3236 (Brookfield RVT Viscometer), the ring and ball softening point by ASTM test method E-28, and needle penetration by ASTM test method D-1321.

EXAMPLE I

The organoaluminum solution was prepared by mixing an equimolar amount of triethyl aluminum and diethyl aluminum chloride in a heptane solution. This solution was fed to the tubular reactor to maintain an Al/Ti mole ratio of 300/1. The solid titanium component of the catalyst is prepared by (1) co-comminuting 8 moles of magnesium chloride with 1.25 moles aluminum trichloride for 12 hours. The product of this step (1) is then co-comminuted with 0.5 moles of titanium tetrachloride for 15 hours in the absence of any electron donor. The resulting solid catalyst has a titanium content of about 2.5 wt %. This catalyst is then pumped continuously to the tublar reactor as a 10 wt % mixture in a 50/50 weight ratio blend of mineral oil and petrolatum, at a rate which maintains the polymerization rate and reactor temperature and yields very high catalyst efficiencies.

EXAMPLE II

An alternate brown $TiCl_3$ catalyst system is prepared by mixing 5 liters of 0.1 molar diethyl aluminum chloride with 5 liters of 0.1 molar titanium tetrachloride $TiCl_4$ (both in heptane) in a 2/1 molar ratio of aluminum to titanium Al/Ti and allowing them to prereact for 15 minutes at ambient temperature, The resulting brown slurry is then slowly added to the tubular reactor at the required rate to maintain a constant temperature and polymerization rate. Any of the indicated monomers may be used with this catalyst system.

EXAMPLE III

Another catalyst system is prepared by suspending 40 pounds of a violet powder composed of ball-milled $3TiCl_3.AlCl_3$ in 60 pounds of mineral oil to form a 40 wt. % slurry. This slurry is added to the reactor with the monomer (s) after mixing with aluminum triethyl in an Al/Ti molar ratio of 10/1.

EXAMPLE IV

A catalyst is prepared by mixing 10 pounds of hydrogen reduced, ball milled titanium trichloride ($TiCl_3$) in 90 pounds of heptane with $(i-C_4H_8)_2AlF$. This slurry is stirred for 30 minutes and then added at a rate which maintains the polymerization rate and a constant temperature. When this catalyst is used in the above described process, it produces about 97% atactic polypropylene with only about 3% isotactic or crystalline material.

EXAMPLE V

Essentially amorphous polypropylene and propylene copolymers with about 10% ethylene, which are suitable for use in hot melt formulations are prepared using the above process and a metallocene catalyst. The catalyst is prepared by mixing 2 moles of cyclopentadiene dissolved in heptane with a heptane solution containing 1 mole of titanium tetrachloride and stirring for 1 hour at room temperature to form the soluble sandwich compound dicyclopentadienyl titanium. A 4 to 1 molar ratio of aluminum to titanium is used for the co-catalyst.

EXAMPLE VI

Propylene monomer is passed through a jacketed tubular reactor of 2 inches in diameter and 500 feet in length at 350° F. in the presence of the $MgCl_2$ supported catalyst prepared as in Example I and added as a 10 wt. % slurry in a 50/50 petrolatum-mineral oil mixture. An equimolar mixture of triethyl aluminum and diethyl aluminum chloride is added to the reactor, along with about 1.9 mol % hydrogen. The polypropylene should have a melt viscosity of 2300 cPs at 190° C., a ring and ball softening point of 160° C., and a needle penetration of 10 dmm. The catalyst efficiency should be high enough (<1 ppm titanium metal) that no catalyst removal step is necessary. A small amount of steam plus about 0.1 wt. % of the antioxidant Irganox 1010 (Ciba-Geigy) are injected into the melt at the exit of the devolatilizing section.

EXAMPLE VII

The polymerization of Example VI is repeated except that the amount of hydrogen is increased to about 2.1 mol %. The polypropylene should have a molecular weight such that its melt viscosity at 190° C. (Brookfield) is about 1000 cPs. The ring and ball softening point (160° C.) and needle penetration (10 dmm) should be the same as the polymer produced in Example VI.

EXAMPLE VIII

Propylene monomer is passed through the tubular reactor at 400° F. in the presence of a catalyst prepared by injecting activated (ball-milled), aluminum reduced $3TiC_3.AlCl_3$ in mineral oil and triethyl aluminum in a 10/1 molar ratio. The catalyst is used in an amount sufficient to maintain polymerization. Hydrogen (about 1.8 mol %) is added in an amount sufficient to control the polymer molecular weight. The polypropylene should have a Brookfield viscosity at 190° C. of 2500 cPs, a ring and ball softening point of 150° C., and a needle penetration hardness of 20 dmm.

EXAMPLE IX

A mixed feed of 88 wt. % propylene and 12 wt. % ethylene is passed through the tubular reactor. An appropriate amount of hydrogen (about 0.6 mol %) and the catalyst of Example I is injected into the monomer mixture in an amount sufficient to maintain polymerization (about 2 ppm of Ti as metal) at a temperature of 375° F. The catalyst efficiency in this run should be high and residual catalyst does not have to be removed. The properties of the copolymer should be a melt viscosity of 10,000 cPs, a ring and ball softening point of 120° C., and a needle penetration of 40 dmm.

EXAMPLE X

The run of Example IX is repeated except that a higher reaction temperature (450° F.) and a larger amount of hydrogen (2.5 mol %) are used. The resulting copolymer should have a melt viscosity of 300 cPs, a ring and ball softening point of 120° C., and needle penetration >100 dmm.

EXAMPLE XI

A monomer feed of 90 wt. % propylene and 10 wt. % ethylene is continuously fed to the tubular reactor. A hydrogen concentration (1.5 mol %) lower than Example X and the catalyst system described in Example I are used. The reaction is carried out at a temperature of 400° F. and an average residence time of 10 seconds. The catalyst residue is neutralized with steam and the polymer is stabilized by injection of 0.1 wt. % the stabilizer Isonox 129 (Schenectady Chemical Co.) in the devolatilization section of the reactor. The resulting copolymer should have a melt viscosity of 2000 cps, a ring and ball softening point of 135° C., and needle penetration of 50 dmm.

EXAMPLE XII

A monomer feed of 96.0 wt. % propylene and 4.0 wt. % ethylene are injected into the tubular reactor maintained at 350° F. The same amount of hydrogen as in Example XI is used. The $MgCl_2$ supported catalyst of EXAMPLE I (which is prepared without added stereoregulator) is used. The resulting stabilized copolymer should have a melt viscosity of 3000 cps, a ring and ball softening point of 150° C., and a needle penetration of 25 dmm.

Example XIII

A mixture of 96.0 wt. % propylene and 4.0 wt. % ethylene is injected into the tubular reactor with a larger amount of hydrogen (about 1.7 mol %) than used in Example XII. The catalyst of Example I is used. The reactor temperature is 350° F. The resulting stabilized copolymer should have a melt (Brookfield) viscosity at 190° C. of 1800 cPs, a ring and ball softening point of 150° C., and a needle penetration of 25 dmm.

EXAMPLE XIV

A monomer mixture of 90 wt % propylene and 10 wt % hexene-1 is injected into the tubular reactor with about 1.8 mol % hydrogen and the catalyst of Example I. The reactor temperature is maintained at about 300° F. The resulting polymer should have a melt viscosity of 5000 cPs, a ring and ball softening point of 130° C., and a needle penetration of 20 dmm.

EXAMPLE XV

A monomer feed of 90 wt. % propylene, 6 wt. % butene-1, and 4 wt. % ethylene is added to the tubular reactor with about 1.9 mol % hydrogen and the catalyst of Example I. The polymerization temperature is maintained about 350° F. The resulting terpolymer should have a Brookfield viscosity of 3,500 cPs, a ring and ball softening point of 105° C., and a needle penetration of 25 dmm.

EXAMPLE XVI

A monomer mixture of 94 wt. % propylene and 6 wt. % butene-1 is added continuously to a stirred autoclave maintained at a reaction temperature of 325° F. by the addition of the catalyst of Example I. Sufficient hydrogen (1.7 mol %) is added to give a copolymer which should have a melt viscosity of 3400 cPs, a ring and ball softening point of 95° C., and a needle penetration of 15 dmm.

EXAMPLE XVII

The polymerization of Example XV is repeated except that at the end of the process, two separate streams are injected by spraying on the Chinese hat. One stream consists of the organic peroxide Lupersol 101, 2,5-dimethyl-2,5-di (t-butyl peroxy)hexane, which is added at a concentration of about 1000 ppm based on the polymer. The second stream consists of sufficient maleic anhydride to give an acid number of about 38 and sufficient hydrogen (0.1 mol %) to give a final product, after passing through the melt pumps, having a melt viscosity of 1800 cPs. The resulting copolymer should have a ring and ball softening point of 82° C. and a needle penetration of 21 dmm.

EXAMPLE XVIII

A run under the same conditions of Example XVII is carried out except that separate streams of a polar monomer and a peroxide are added to the exit of the devolatilization section of the plant, in the intake of a static mixer or a short barrel extruder. The peroxide of Example XVII, Lupersol 101, is added at a concentration of 1200 ppm. The polar monomer is acrylic acid added at a concentration of 6% based on copolymer produced. The product should show greatly increased adhesion to metal and polymer substrates.

EXAMPLE XIX

In order to produce materials having different properties from the commercially available APAO polymers, the $MgCl_2$ supported catalyst of Example I is prepared as described but with the addition of about 30% of the usual amount of the stereoregulator ethyl p-toluate (EpT). About 0.2 moles of EpT per mole of aluminum alkyl are used. The catalyst system is added continuously to the tubular reactor. The monomer feed stream consists of 93 wt. % propylene and 7 wt. % ethylene. The reactor is maintained at 380° F. with sufficient hydrogen (about 0.8 mol %) to give a copolymer having a melt viscosity of 6900 cps. The copolymer should have a ring and ball softening point of 140° C. and a needle penetration of 15 dmm. This combination of properties is different from those normally obtained with APAO and should provide increased tensile properties (tensile strength and impact) due to a substantial increase in stereoregularity of the resulting copolymer.

EXAMPLE XX

A monomer feed of 88 wt. % propylene and 12 wt. % butene-1 is passed through a tubular reactor at 325° F. The catalyst of Example XIX, which includes the ethyl-para-toluate stereoregulator, is used with sufficient hydrogen (about 1.0 mol %) to give a copolymer having a Brookfield melt viscosity of 4200 cPs. The copolymer should have a ring and ball softening point of 82° C. and a needle penetration of 25 dmm. This combination of properties should be unique when compared to commercial APAO due to the increased stereoregularity of the copolymer.

EXAMPLE XXI

The conditions of Example XX are used except that the monomer feed contains 92 wt. % propylene and 8 wt. % butene-1. Less hydrogen is added (about 0.5 mol %) to give a copolymer which should have a melt viscosity of 12,000 cPs, a ring and ball softening point of 93° C., and a needle penetration of 5 dmm.

The invention claimed is:

1. A process for preparing an atactic, substantially amorphous, tacky polypropylene or propylene-ethylene copolymer, which comprises the steps of:
    (a) introducing into a pressurized reactor, maintained at about 180° to 450° F. and at about 450 to 5000 psig, monomer(s) selected from the group consisting of (i) liquefied propylene and (ii) liquefied propylene and liquefied ethylene, with the propylene being present in an amount of at least about 65% by weight and with the ethylene being present in an amount of up to about 35% by weight, with the weight percentages totaling 100%.;
    (b) introducing a metallocene catalyst consisting essentially of a soluble sandwich compound of a titanium halide into the reactor;
    (c) allowing the liquefied monomer(s) to vaporize in the reactor;
    (d) polymerizing the vaporized monomer(s) in the reactor;
    (e) discharging a mixture of gaseous monomer(s) and molten polymer or copolymer from the reactor; and
    (f) separating the gaseous monomer(s) from the molten polymer or copolymer.

2. The process of claim 1, wherein the pressurized reactor is a jacketed, cooled tubular reactor or a stirred autoclave.

3. The process of claim 1, wherein the amount of ethylene is about 4–12% when the polymer is the propylene-ethylene copolymer.

4. The process of claim 1, wherein the metallocene catalyst is dicyclopentadienyl titanium.

5. The process of claim 1, wherein hydrogen is added to the reactor in an amount sufficient to provide a polymer with a reduced molecular weight, which polymer has a Brookfield viscosity at 375° F. of 10–10,000 cps.

6. The process of claim 5, wherein the amount of hydrogen is about 0.1–2.5 mol % based on the monomer(s) added.

7. The process of claim 1, further comprising the steps of discharging the molten (co)polymer through a let down into a separator vessel which is equipped with an inverted, cone-shaped, heated surface and then into a second lower pressure vessel to remove residual monomer(s) and optionally recycling the monomer(s).

8. The process of claim 7, further comprising the steps of passing the molten (co)polymer into a heated vessel maintained at a lower pressure than the pressure used during the polymerization and adding steam to inactivate the catalyst.

9. The process of claim 1, further comprising the step of adding about 0.1 wt. % of an organic peroxide to a heated vessel and sequentially adding about 6 wt. % of either maleic anhydride or acrylic acid downstream of the peroxide addition.

10. The process of claim 9, further comprising the step of adding the molten (co)polymer an antioxidant in an amount sufficient to stabilize the (co)polymer.

11. The process of claim 1, further comprising the step of slabbing or briquetting the molten (co)polymer.

12. A process for preparing an atactic, substantially amorphous, tacky propylene-ethylene-$C_4$–$C_8$ alpha-olefin terpolymer, which comprises the steps of:
    (a) introducing into a reactor, maintained at about 180°–450° F. and about 450–5000 psig, liquefied propylene, liquefied ethylene, and a liquefied $C_4$–$C_8$ alpha-olefin, with the amount of the liquefied propylene being at least about 65%, with the amount of the liquefied ethylene being up to about 35%, and with the amount of the liquefied $C_4$–$C_8$ alpha-olefin being up to about 15% by weight, with the percentages being by weight and totaling 100%;

(b) introducing a transition metal catalyst and an organometallic co-catalyst into the reactor;
(c) allowing the liquefied propylene, the liquefied ethylene, and the liquid $C_4$–$C_8$ alpha-olefin to vaporize in the reactor;
(d) polymerizing the vaporized propylene, vaporized ethylene, and vaporized $C_4$–$C_8$ alpha-olefin in the reactor;
(e) discharging a mixture of gaseous propylene, gaseous ethylene, and gaseous $C_4$–$C_8$ alpha-olefin and molten terpolymer from the reactor; and
(f) separating the gaseous propylene, gaseous ethylene, and gaseous $C_4$–$C_8$ alpha-olefin from the molten terpolymer.

13. The process of claim 12, wherein the catalyst is titanium trichloride aluminum chloride ($3TiCl_3 \cdot AlCl_3$) and wherein the molar ratio of aluminum to titanium in the catalyst is from about 2:1 to 10:1.

14. The process of claim 12, wherein the catalyst system is prepared by mixing 0.1 mole of an alkyl aluminum halide and 0.1 mole of a titanium tetrahalide in amounts sufficient to provide an aluminum to titanium molar ratio of about 0.5:1 to 5:1 and allowing the mixture to prereact in an inert diluent for about 5 to 30 minutes before addition of the mixture to the reactor.

15. The process of claim 12, wherein the catalyst is prepared by mixing a titanium trihalide in a diluent with an alkyl aluminum fluoride selected from the group consisting of pentaethyl dialuminum fluoride, diisolbutyl aluminum fluoride, and diethyl aluminum fluoride.

16. The process of claim 12, wherein the catalyst is a metallocene catalyst consisting essentially of a soluble sandwich compound of a titanium halide.

17. The process of claim 16, wherein the metallocene catalyst is dicyclopentadienyl titanium.

18. The process of claim 12, further comprising the step of adding about 0.1 wt % of an organic peroxide to a heated vessel and sequentially adding about 6 wt. % of either maleic anhydride or acrylic acid downstream of the peroxide addition.

19. The process of claim 18, further comprising the step of adding to the molten polymer an antioxidant in an amount sufficient to stabilize the polymer.

20. The process of claim 12, whereing the amount of $C_4$–$C_8$ alpha-olefin is about 4–12%.

21. The process of claim 12, wherein the amount of ethylene is about 4–12% and the amount of $C_4$–$C_8$ alpha-olefin is about 4–12%.

* * * * *